United States Patent [19]
Nakamura

[11] 4,389,634
[45] Jun. 21, 1983

[54] CHARACTER READING APPARATUS

[75] Inventor: Yoshikathu Nakamura, Yokosuka, Japan

[73] Assignees: Tokyo Shibaura Denki Kabushiki Kaisha, Kawasaki; Tokyo Electric Co., Ltd., Tokyo, both of Japan

[21] Appl. No.: 206,832

[22] Filed: Nov. 14, 1980

[30] Foreign Application Priority Data

Nov. 16, 1979 [JP] Japan .................................. 54-147664
Nov. 16, 1979 [JP] Japan .................................. 54-147667

[51] Int. Cl.³ .............................................. G06K 9/22
[52] U.S. Cl. ........................................ 382/11; 382/59; 382/65
[58] Field of Search ........... 340/146.3 SY, 146.3 MA, 340/146.3 H, 146.3 R, 146.3 AH, 146.3 D, 146.3 SG; 235/454, 472

[56] References Cited

U.S. PATENT DOCUMENTS 3,964,022 6/1976 Martin .
4,056,804 9/1976 Whitfield et al. ............ 340/146.3 SY
4,075,605 2/1978 Hilley et al. .............. 340/146.3 MA
4,180,799 12/1979 Smith ....................... 340/146.3 MA
4,180,800 12/1979 Isshiki et al. ............. 340/146.3 MA Primary Examiner—Leo M. Boudreau
Attorney, Agent, or Firm—Oblon, Fisher, Spivak, McClelland & Maier

[57] ABSTRACT

A character reading apparatus including a scanning unit manually moved along a line of characters for periodically and optically scanning the character and producing character pattern data concerning the scanned character, a memory accommodating conditional data prescribing effective character patterns and a pattern identification unit for executing identification process for a character pattern obtained from the scanning unit when the character pattern is determined to be effective, is disclosed. The character reading apparatus further includes an optimum character detection circuit, which compares the widths of character patterns represented by effective character pattern data to detect a character pattern having the greatest width and causes identification process to be executed for the character pattern data having the largest width.

7 Claims, 52 Drawing Figures

FIG. 3A  FIG. 3B  FIG. 3C  FIG. 3D  FIG. 3E

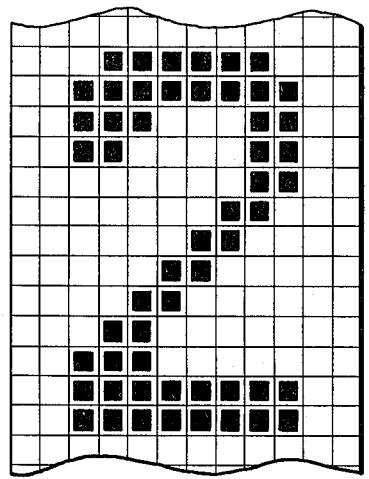
F I G. 6
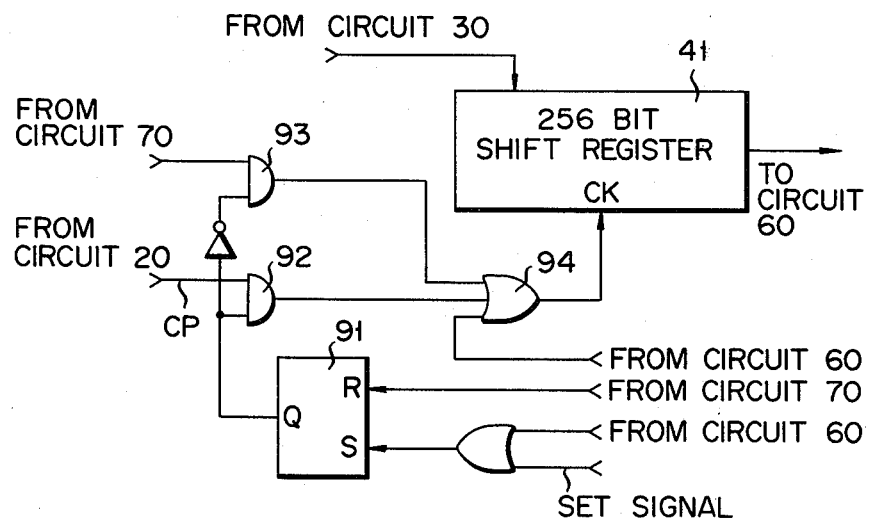
F I G. 7

| BIT POSITION | | | | | | | | | | | | | | | |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 0 | ALU - INST | | | | | | READ ADR | | | | | WRITE ADR | | | |
| 1 | 1 | TEST CONDITION | | | | | DESTINATION ADR | | | | | | | | |
| 1 | 0 | 0 | COMMAND | | | | | | | | | | | | |
| 1 | 0 | 1 | IMMEDIATE DATA | | | | | | | SLCT | | | WRITE ADR | | |

| H1 | HO |
| --- | --- |
| W1 | WO |
| PASS | XO |
| PSCT | YO |
| SCH | N |

CHARACTER READING APPARATUS

BACKGROUND OF THE INVENTION

This invention relates to character reading apparatus.

Character reading apparatus with a hand-held scanner have been used for the purpose of reducing the time required for producing bills at the counter of department stores, supermarkets and other retail shops and stores, preventing misinputs due to erroneous keying and realizing automation of account and stock keeping. The apparatus have a photoelectric converter, which is manually operated to scan, for instance, a line of characters printed on a price card for optically reading these characters. The identified character data thus obtained from the apparatus may be automatically fed to a POS system or the like.

When operating this sort of character reading apparatus, the hand-held scanner having a photoelectric converter has to be manually operated for scanning price card, and the scanning speed is not fixed. In order to obtain accurate character pattern data irrespective of fluctuations of the scanning speed and thus simplify the following character identification process, it has been in practice to use as the photoelectric converter an area scanner having a matrix array of photoelectric converting elements (as disclosed, for instance, in U.S. Pat. No. 3,964,022).

In the optical character reading apparatus as disclosed in U.S. Pat. No. 3,964,022, the identification circuit is comprised of a logic circuit for extracting the features of characters. In this arrangement, the identification of the characters can be performed at high speeds. However, where the number of characters to be identified is desired to be increased or where the form or type of the character is changed, there is inconvenience that the logic circuit has to be redesigned. On the other hand, a similarity method or pattern matching method is known as an identification system of the conventional mechanical scan type character identification apparatus as is disclosed in U.S. Pat. No. 3,688,267. According to the similarity method, where there is involved an increase in the number of the characters to be identified or a change in the form of the characters, this situation can be easily coped with by merely changing the standard pattern data for the dictionary. If, however, the similarity method is used, there is a problem that a longer time is required for the identification of one character than in U.S. Pat. No. 3,964,021.

For obtaining reliable identification of a character in a short period of time, it is desired to execute the identification process for character pattern data that is obtained when the light receiving area of the photoelectric converter is located substantially at the center of the corresponding character pattern. For this reason, the identification process for character data is executed when it is confirmed that when incident light data of a character pattern are detected the height and width directions thereof and that the data contains the whole character pattern data of the character to be identified and no trace of the pattern of an adjacent character. In this case, the space between adjacent characters is concurrently detected on the basis of the projection data in the width direction of character. When the space is detected, character pattern data concerning the next character is subjected to identification process. However, when a line of characters is scanned obliquely with the area scanner, when a character line contains characters of a greater size than the proper size, when there is an ink stain or spot in the inter-character space or when there are fluctuations of ink density of printed characters, it is impossible to obtain reliable detection of the inter-character space. Therefore, with the prior-art character reading apparatus dropout of character and repeated reading of the same character a plurality of times are liable, and this is undesired from the standpoint of the reliability of reading.

In a further aspect, since the character identification process takes considerable time, it has been in usual practice to execute identification process for the first character pattern, which is obtained after the detection of an inter-character space and satisfies the afore-mentioned predetermined condition. However, there is a possibility that a character pattern having a superior state to the first detected effective character pattern will be subsequently be found. Of course, the reliability of the character reading apparatus can be increased if it is arranged such that the identification process is executed for a character pattern in the most satisfactory state.

SUMMARY OF THE INVENTION

An object of the invention is to provide a character reading apparatus, which can read and identify characters or the like with high reliability and independently of the scanning speed of the scanner.

In one form of the invention, there is provided a character reading apparatus, which comprises photoelectric converting means manually moved for periodically and optically scanning a character or characters and producing a plurality of successive output data corresponding to the character pattern, a judging means for producing an output signal when it is detected that the output data from said photoelectric converting means meets a condition required for identification process to be executed, a memory means, a comparator means for comparing, in response to the output signal from the judging means, the content of the memory means and the output data from the photoelectric converting means and producing, when it detects that the output data from the photoelectric converting means represents a superior character pattern to that of the content of the memory means, an output signal for causing the output data from the photoelectric converting means to be stored in the memory means, and an identifying means for effecting identification process for the output data from the photoelectric converting means.

According to the invention, when a plurality of effective character pattern data are detected for a single character, the identification process is done for the character pattern data that is determined to be optimum, so that it is possible to obtain satisfactory results of the identification process due to a similarity or a pattern matching method.

BRIEF DESCRIPTION OF THE DRAWINGS

This invention can be more fully understood from the following detailed description when taken in conjunction with the accompanying drawings, in which:

Figures 3A, 3B, 3C, 3D, 3E:
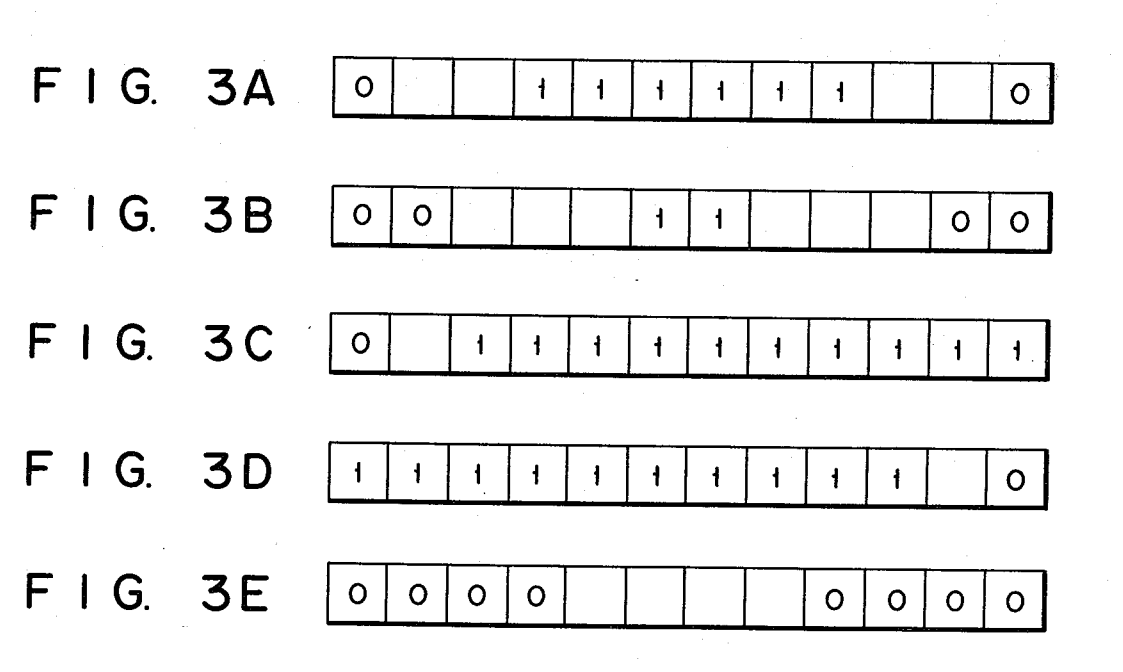

FIGS. 3A through 3E show conditions required for the width data of effective character pattern data, FIG. 6 is a view for illustrating the character pattern data corresponding to a detected character, FIG. 7 is a schematic circuit diagram of a pattern memory and driver circuit in the character reading apparatus shown in FIG. 2.

DETAILED DESCRIPTION OF THE PREFERRED EMBODIMENTS

Figure 1:
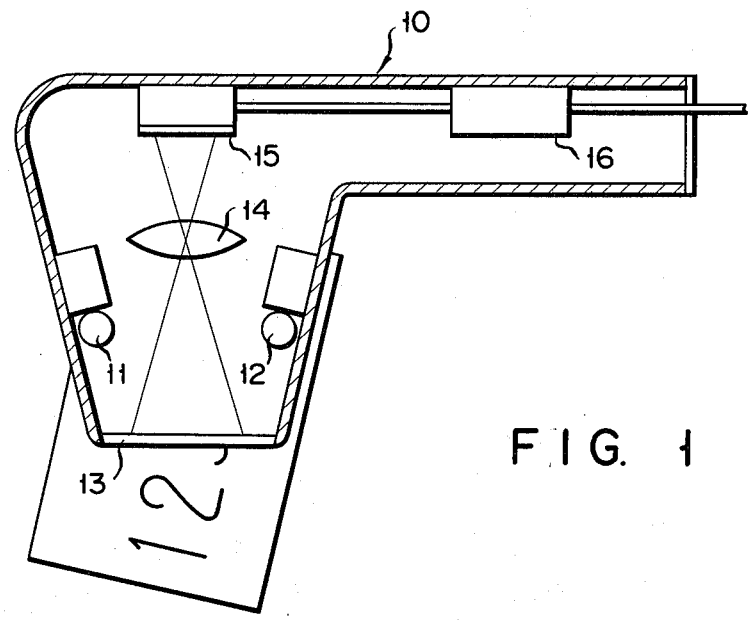
FIG. 1 is a schematic view showing an area scanner used in a character reading apparatus according to the invention.

FIG. 1 shows an area sensor used for the character reading apparatus according to the invention. In this specification, the term "character" refers not only to the alphabetic characters but also to other characters such as numerals and symbols. When reading characters printed on, for instance, a price card, the area sensor 10 is set to face the price card as shown in FIG. 1, and is then moved by hand along a line of characters on the card. In this case, the speed of moving the area scanner 10 may vary in the range of 50 mm/sec to 600 mm/sec. At this time, light from lamps 11 and 12 provided within the housing of the area sensor 10 is projected through a window 13 onto the price card. Light reflected by the surface of the price card is focused through a lens 14 on a photoelectric converter 15, which is formed of, for instance, a matrix array of 12×40 photoelectric converting elements each having a resolution of 0.2 mm. This photoelectric converter 15 serially produces electric signals each corresponding to the quantity of light incident on the light receiving surface of each photoelectric converting element under the control of a clock pulse signal from a scan control and timing circuit 20 which will be described later. The output of the photoelectric converter 15, which is an analog signal, is supplied through a driver circuit 16 to a quantization circuit 30.

Figure 2:
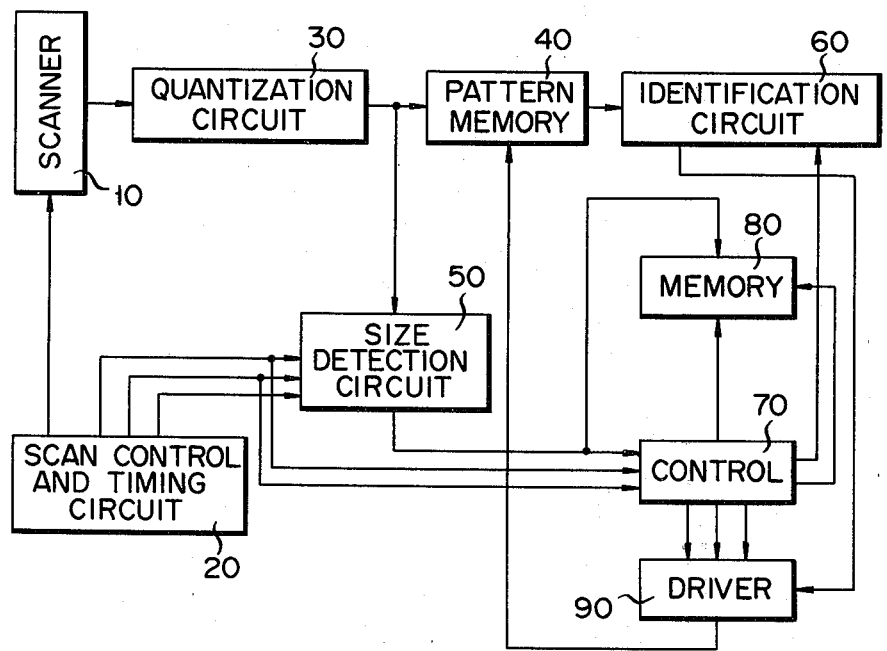
FIG. 2 is a block diagram showing an embodiment of the character reading apparatus according to the invention.

FIG. 2 shows a block diagram of the character reading apparatus according to the invention. In FIG. 2, the analog signal from the scanner is supplied to the quantization circuit 30 according to the clock pulse signal from the scan control and timing circuit 20. The quantization circuit 30 quantizes the input signal into quantized signal; for instance it produces 12×40 quantized signals for every frame. The output signal of the quantization circuit 30 is supplied to a pattern memory 40, which has a capacity of, for instance, 12 bits by 21 words, and also to a character size detection circuit 50. The character pattern data stored in the pattern memory 40 is supplied to an identication circuit 60 for effecting identification processing according to the similarity method or pattern matching method when it satisfies predetermined conditions to be described later.

The character size detection circuit 50 detects the height and width of the character represented by the character pattern data stored in the pattern memory and supplies height data and 12-bit width data to a control circuit 70 and a memory 80. When the control circuit 70 detects the fact that the height data from the detection circuit 50 has a value within a predetermined range, it is checked if the 12-bit width data from the circuit 50 conforms to a particular condition defined by data as shown in FIGS. 3A through 3E (blank portions in these patterns can be either "0" or "1"). When width data meeting the afore-mentioned condition is detected, the control circuit 70 compares the detected width data and the width data stored in the memory 80 which is cleared in the initial state and supplies a write signal to the memory 80 for storing the width data of greater value in the memory 80. Then, the control circuit 70 supplies an identification process start signal to the identification circuit 60.

The character size detection circuit 50 also supplies an output signal EOC representing the end of the character pattern being stored in the pattern memory 40 to the control circuit 70, which in turn causes the driver circuit 90 to prevent data from the quantization circuit 30 to be written into the pattern memory 40.

Figure 4:
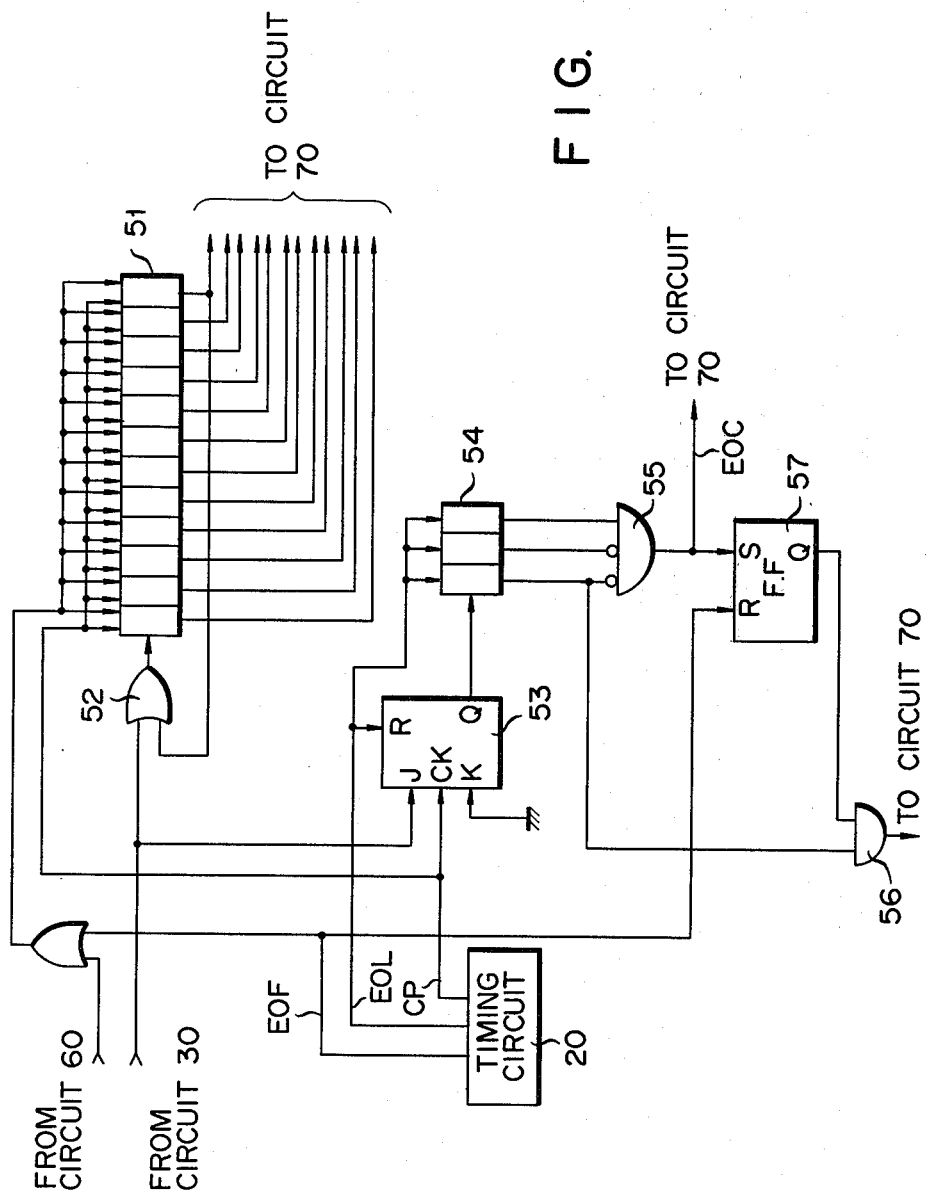
FIG. 4 is a circuit diagram of a character size detection circuit used in the character reading apparatus shown in FIG. 2, FIGS. 5A through 5G form a waveform chart for illustrating the operation of the detection circuit shown in FIG. 4.
Figure 5:
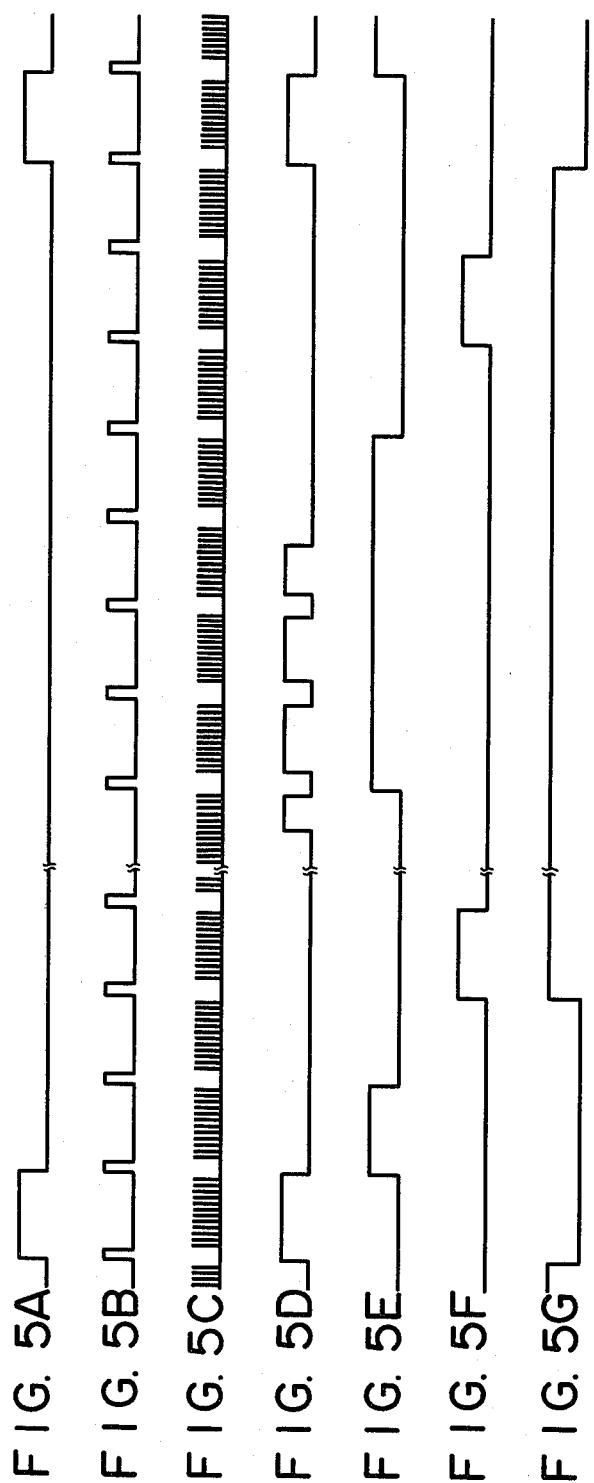

FIG. 4 shows a specific circuit construction of the character size detection circuit 50. This character size detection circuit 50 is driven by timing block signals EOF, EOL and CP as respectively shown in FIGS. 5A through 5C produced from the timing circuit 20. It includes a 12-bit shift register 51, which is driven by the clock pulse signal CP and is reset by the signal EOF, which is a frame sync. signal defining the frame period. The output signal from the last stage of the shift register 51 is supplied to the first stage through an OR gate 52 which also receives at the other input terminal the output signal as shown in FIG. 5D produced from the quantization circuit 30. The outputs from all the bits of the shift register 51 are supplied to the control circuit 70. The character size detection circuit further includes a J-K flip-flop 57, which has J input terminal receiving the output signal from the quantization circuit 30, K input terminal grounded, CK input terminal receiving the clock pulse signal CP from the timing circuit 20 and R input terminal receiving the signal EOL which is a line sync. signal from the circuit 20, and also a 3-bit shift register 54 driven by the line sync. signal EOL from the timing circuit 20. The output signal from the first bit of the shift register 54 is supplied after inversion to an AND gate 55 and is also supplied directly to an AND gate 56. The second bit output signal of the shift register 54 is supplied after inversion to a second input terminal of the AND gate 5, and the third bit output signal of the shift register is directly supplied to a third input terminal of the AND gate 55. The output signal of the AND gate 55 is supplied to S input terminal of an R-S flip-flop 57, and is also supplied as end-of-character signal EOC to the control circuit 70. The flip-flop 57 receives at its R input terminal the frame sync. signal EOF from the timing circuit 20 and supplies its Q output signal to the other input terminal of the AND gate 56.

The shift registers 51 and 54 are first reset by the frame sync. signal EOF from the timing circuit 20, and then the shift register 51 is driven by the clock pulse signal CP. As shown in FIG. 5D, a high level signal is produced from the quantization circuit 30 in synchronism with the frame sync. signal EOF. In response to the high level signal from the quantization circuit 30, the flip-flop 53 produces a high level signal to the shift register 54. Thus, a "1" signal is written into the first digit of the shift register 54 when a next line sync. signal EOL is generated as shown in FIG. 5E. After generation of two further line sync. signals, data "001" is written into the shift register 54, causing the AND gate 55 to produce a high level signal as shown in FIG. 5F. In response to the high level signal from the AND gate 55, the flip-flop 57 is set to produce a high level signal as shown in FIG. 5G. When a next line sync. signal EOL is generated, data "0" is written into the third digit of the shift register 54, causing the AND gate 55 to produce a low level signal as shown in FIG. 5F.

So long as the output signal from the quantization circuit 30 is at a low level, data "0" is written in each digit of the shift register 51. At this time, the Q output signal of the flip-flop 53 is held at a low level, so that data "0" is also written in each digit of the shift register 54. When a high level output signal is produced from the quantization circuit 30, "1" is written in a corresponding digit of the shift register 51 under the control of the clock pulse CP supplied during this high level period. Also at this time, the Q output signal of the flip-flop 53 is changed to a high level, so that "1" is written in the first bit of the shift register 54 under the control of the next line sync. signal EOL. Thus, the output signal from the first stage of the shift register 54 becomes high as shown in FIG. 5E. At this time, since the flip-flop 57 has been set and providing a high level signal as its Q output signal, the output signal from the AND gate 56 is changed to a high level. When the output signal from the quantization circuit 30 is continuously detected in this way, "1" is written in successive digits. When the output signal of the quantization circuit 30 is changed to and then remains at a low level, with the appearance of the line sync. signal EOL subsequently produced after the lapse of one line period "0" is written in the first digit of the shift register 54 from which a low level signal is produced as shown in FIG. 5E. At this time, the output signal from the AND gate 56 is changed to a low level. When the first and second digits of the shift register 54 subsequently come up with "0" with the appearance of the next line sync. signal, the output signal of the AND gate 55 is changed to a high level as shown in FIG. 5F, thus setting the flip-flop 57. This output signal of the AND gate 55 is inverted to low level when "0" is also written in the last bit of the shift register 54 by the next line sync. signal EOL.

At the time when the end-of-character signal EOC is produced from the AND gate 55, data concerning the width of a character scanned by the scanner 10 is obtained as the content of the shift register 51. For example, when a character is scanned and the character pattern data corresponding to the dot pattern data (each dot represents a photoelectric converting element receiving a small amount of light) as shown in FIG. 6 is obtained, then the contents of the shift register 51 will be "001111111100".

FIG. 7 shows a specific example of the construction of the pattern memory 40 and driver circuit 90 shown in FIG. 2. The driver circuit 90 includes a flip-flop 91, which is set by a set signal generated at the time of power-ON operation or an output signal from the identification circuit 60, and reset by an output signal from the control circuit 70, and AND gates 92 and 93. The AND gate 92 receives at one of its input terminals the Q output signal from the flip-flop 91 and at its other input terminal the clock pulse signal CP from the timing circuit 20. On the other hand, the AND gate 93 receives at one input terminal a Q output signal from the flip-flop 91 through an inverter and at the other input terminal an output signal from the control circuit 70. Output signals from the AND gates 92 and 93, and the identification circuit 60 are supplied to an OR gate 94. The pattern memory 40 is constituted by a 256-bit shift register 41, which receives the output signal from the quantization circuit 30 and is driven by a clock pulse signal supplied from an OR gate 94.

When it is set by for example, a set signal, the flip-flop 91 produces a high level Q output signal. As a result, the clock pulse signal CP is supplied through the AND gate 92 to the shift register 41, so that the output signal from the quantization circuit 30 is sequentially stored in the shift register 41. It will be seen that scanner 10 is scanning a character in its proper position, optimum character data is stored in the shift register 41.

Figure 8:
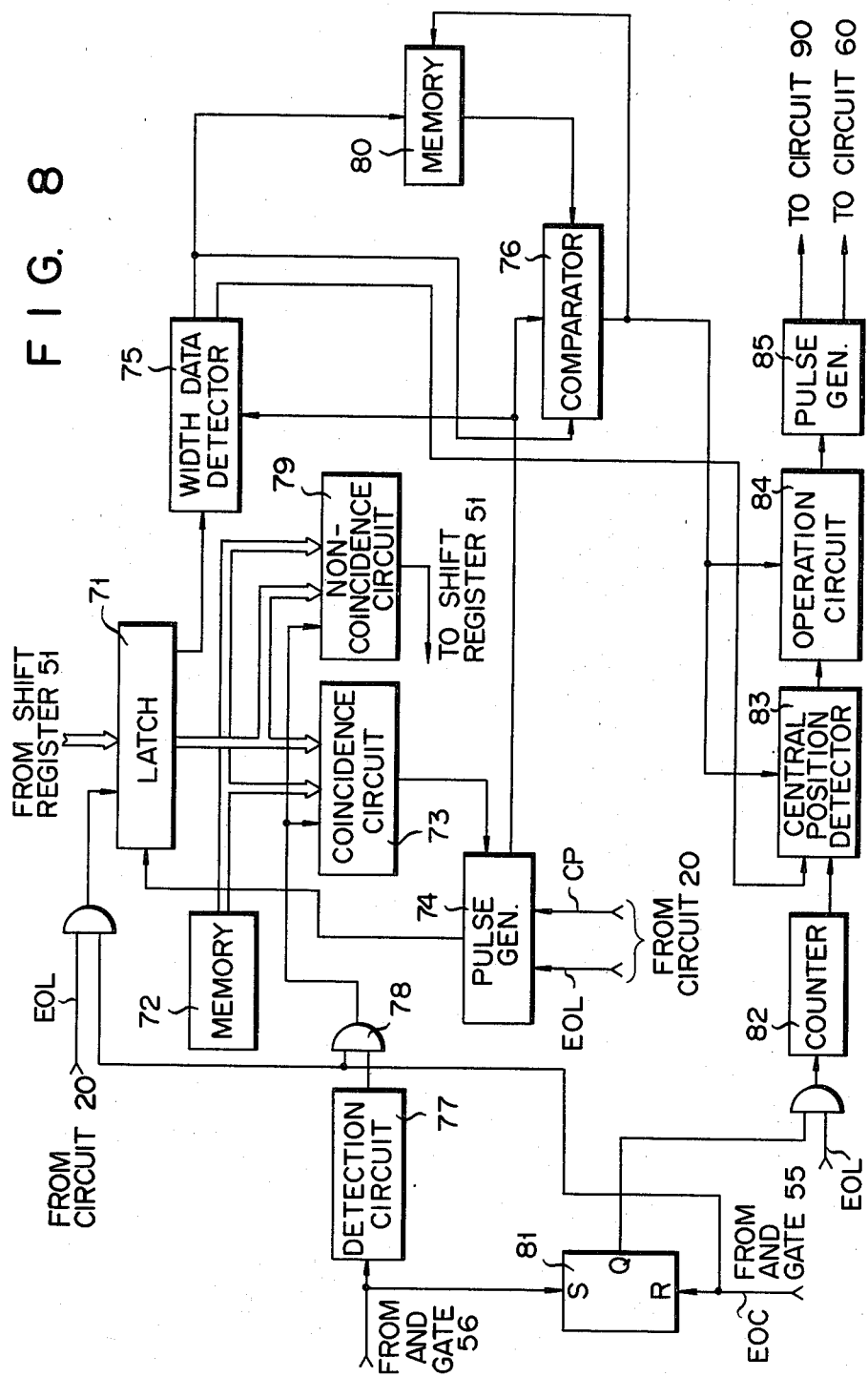
FIG. 8 is a circuit diagram of a control circuit in the character reading apparatus shown in FIG. 2.

FIG. 8 shows an example of the control circuit 70. The control circuit 70 includes a latch type 12-bit shift register 71, a memory 72 for storing pattern width data corresponding to the conditional data shown in FIGS. 3A to 3E, a coincidence circuit 73 producing an output signal when detecting that the contents of the shift register 71 satisfy the condition defined by the data shown in FIGS. 3A to 3E, and a noncoincidence circuit 79 producing an output signal when detecting that the contents of the shift register 71 do not satisfy the condition defined by the data shown in FIGS. 3A to 3E. As will be detailed later, a pulse generator 75 produces twelve pulses to the latch circuit 71 in response to an output signal from the coincidence circuit 73 so that data stored in the shift register 71 is transferred from the last stage thereof to a width data detector 75. The width data detector 75 produces, as will be detailed later, a first output data representing the width of the detected character pattern and a second output data representing the central position of the detected character pattern in the width direction. The first output data from the detector 75 is supplied to the memory 80 and a comparator 76 which compares the first output data and the contents of the memory 80 in response to an output signal from the pulse generator 74. When detecting that the first output data has a larger value than the contents of the memory 80, the comparator 80 produces an output signal, permitting the first output data to be written into the memory 80.

A height detection circuit 77 receives an output signal from the AND gate 56 to check if the output signal from the AND gate 56 is kept at a high level for longer than a preset period of time. When detecting that the time of the high level of the output signal from the AND gate 56 is longer than the preset period, the height detection circuit 77 produces a high level to enable an AND gate 78 so that an output signal EOC from the AND gate 55 is supplied through the AND gate 78 to the coincidence and noncoincidence circuits 73 and 79 to set the same at the operation mode. The control circuit 70 further includes an R-S flip-flop 81 receiving output signals of the AND gate 55 and 56 at R and S input terminals, respectively. The Q output terminal of the flip-flop 81 is connected to a counter 81 through an AND gate receiving line sync. signal EOL at one input terminal. The output terminal of the counter 82 is connected to a central position detector 83 which also receives the second output data from the width data detector 75 to determine the central position of the detected character pattern reperesented by the character pattern data stored in the shift register 41. An output data from the central position detector 83 is supplied to an operation circuit 84 which calculates the positional difference between the central position determined by the detector 83 and the preset central position and produces to a pulse generator 85 an output signal having a high level period corresponding to the positional difference. Then, the pulse generator 85 generates to the shift register 41 pulses whose number corresponds to the positional difference and, after generation of required number of pulses, produces a ready signal to the identification circuit 60.

Figure 9:
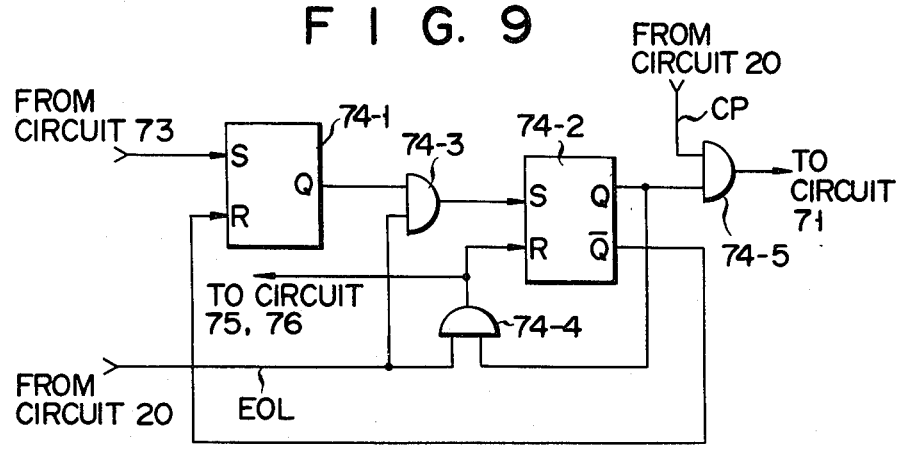
FIG. 9 is a circuit diagram of a pulse generator used in the control circuit of FIG. 8.

As shown in FIG. 9, the pulse generator 74 includes flip-flops 74-1 and 74-2, an AND gate 74-3 receiving and Q output signal from the flip-flop 74-1 and a line sync. signal EOL, an AND gate 74-4 receiving a Q output signal from the flip-flop 74-2 and a line sync. signal EOL, and an AND gate 74-5 receiving a Q output signal from the flip-flop 74-2 and a clock pulse CP.

When the flip-flop 74-1 is set in response to an output signal from the coincidence circuit 73 to produce a high level output signal, the AND gate 74-3 is enabled, thereby permitting an line sync. signal EOL to be supplied to the S terminal of the flip-flop 74-2, then, the flip-flop 74-2 produces a high level output signal so that the AND gates 74-4 and 74-5 are enabled. As a result, twelve clock pulses are supplied through the AND gate 74-5 to the shift register 71 to transfer bit by bit the data stored therein. After generation of twelve clock pulses to the shift register 71, a line sync. signal EOL is supplied through the AND gate 74-4 to the R terminal of the flip-flop 74-2. Then, the flip-flop 74-2 produces a low level output signal to disable the AND gate 74-5 and a high level output to the flip-flop 74-1 to reset the same.

Figure 10:
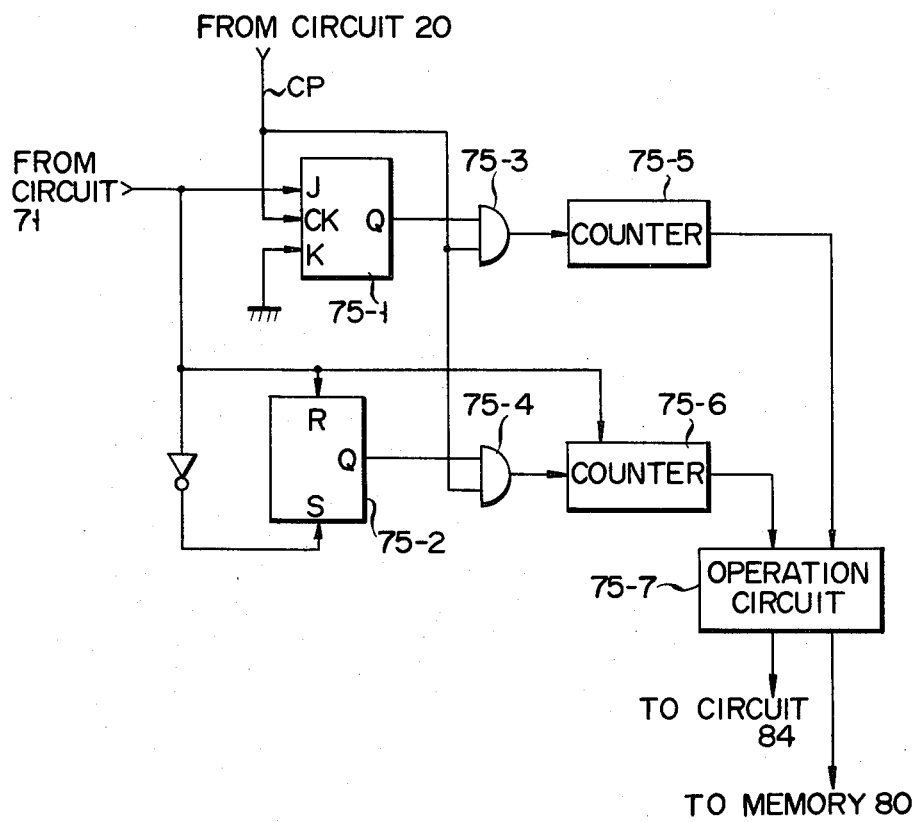
FIG. 10 is a circuit diagram of a width data detector used in the control circuit of FIG. 8, FIGS. 11A through 11F show character patterns detected by the moving scanner for the purpose of illustrating the operation of the control circuit shown in FIG. 8.

As shown in FIG. 10, the width data detector 75 includes a J-K flip-flop 75-1, R-S flip-flop 75-2, AND gates 75-3 and 75-4 receiving at one input terminal a clock pulse CP from the timing circuit 20, counters 75-5 and 75-6 respectively connected to the AND gates 75-3 and 75-4, and an operation circuit 75-7.

At an initial stage, the J-K flip-flop 75-1 is reset to produce a low level signal so that the AND gate 75-3 is disabled. When a "1" bit signal is produced from the shift register 71, a high level signal is produced from the flip-flop 75-1 to enable the AND gate 75-3, to reset the flip-flop 75-2 and to clear the counter 75-6. As long as "1" bit signals are sequentially produced from the shift register 71, a clock pulse CP is supplied through the AND gate 75-3 to the counter 75-5. After this, when a "0" bit signal is produced from the shift register 71, flip-flop 75-2 is set to enable the AND gate 75-4 so that a clock pulse CP is supplied through the AND gate 75-4 to the counter 75-6. The flip-flops 75-1 and 75-2 can be reset by a signal produced from the AND gate 74-4 of the pulse generator 74. That is, the counter 75-5 has content corresponding to the number of bits counted after the first "1" bit is detected in the shift register 71 and the counter 75-6 has contents corresponding to the number of "0" bits counted after the last "1" bit is detected in the shift register 71. The operation circuit 75-7 processes the data from the counters 75-5 and 75-6 to produce a first output signal representing the width of the character pattern and a second output data representing the central position of the character pattern in the width direction.

Referring again to FIG. 8, when an end-of-character signal EOC is generated from the AND gate 55 to the shift register 71 through an AND gate 86 receiving a line sync. signal at one input terminal, 12-bit data stored in the shift register 51 is transferred into the shift register 71. The contents of the shift register 71 is compared with the contents of memory 72 by the coincidence and noncoincidence circuits 73 and 79. If the contents of the shift register 51 and the memory 72 are quite different from each other, then noncoincident circuit 79 supplies an output signal to the shift register 51 to clear the same (For clarification, connection is omitted). If it is detected that the contents of the shift register 71 satisfy the condition defined by the condition data stored in the memory 72, the coincidence circuit 73 produces an output signal, thereby permitting the pulse generator 74 to generate twelve pulses to the shift register 71. As described before, the width data detector 75 produces a first output data corresponding to the width of the detected character pattern to the comparator 76 and memory 80, and a second output data to the central position detector 83. When it is detected that the first output data from the detector 75 has a larger value than the contents of the memory 80, the comparator 76 produces an output signal, thereby permitting the first output data from the detector 75 to be written into the memory 80.

When the flip-flop 81 is set in response to the leading edge of an output signal from the AND gate 56, a high level output signal is supplied so that a line sync. signal can be supplied to the counter 82. Thus, the counter 82 has the contents corresponding to the distance of the top position of the detected character pattern from the reference prosition when an end-of-character signal EOC is supplied to the flip-flop 81 and reset the same. The central position detecting circuit 83 determines the central position of the character pattern in guestion from the height data from the counter 82 and width data from the width data detector 75. The operation circuit 84 and pulse generator 85 constitute a normalization circuit for shifting the central position of the character pattern stored in the shift register 41 to a predetermined position in response to the output signal from the comparator 76 so that the central position of the character pattern corresponding to the character pattern data to be transferred to the identification circuit 60 is always set to a predetermined position. The pulse generator 85 further supplies a trigger pulse to the identification circuit 60 after the generation of pulses corresponding in number to the extent of shift calculated by the operation circuit 84. In response to this trigger signal, the identification circuit 60 is set to the initial state, whereupon it supplies a shift clock pulse to a clock terminal of the shift register while fetching normalized character pattern data stored in the shift register 41 and commencing identification process for the fetched character pattern data.

It is to be noted that even when a character pattern having a greater width than that of the character pattern being under the identifying process, the identification circuit 60 is set to the initial state for commencing identifying process for this new character pattern.

Figure 11A:
Figure 11B:
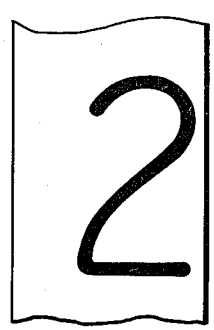
Figure 11C:
Figure 11D:
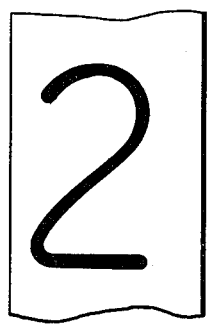

FIGS. 11A through 11F show character patterns corresponding to character pattern data stored in the pattern memory 40 for each frame as the area scanner 10 is moved over a price card. Character pattern data correspoding to the character pattern as shown in FIG. 11A is stored in the pattern memory 40 during a certain frame. The width data for this pattern data, i.e., the data stored in the 12-bit shift register 51 at the end of this frame, is "000000011111". This width data coincides with none of the pattern data shown in FIGS. 3A through 3F. Thus, the coincidence circuit 73 in the control circuit 70 produces no output signal, and the memory 80 remains in the cleared state. FIG. 11B shows the character pattern corresponding to the pattern data obtained during the next frame period. The width data for this character pattern is "000111111110". This width data meets the condition specified by the width data shown in FIG. 3A, and thus the coincidence circuit 73 supplies an output signal. Since the width data "8" from the width detector 75 at this time is greater in value than the content "0" of the memory 80 which is in the cleared state, it is written in the memory 80. At this time, a trigger signal is supplied from the pulse generator 75 to the circuits 83 and 84 so that the character pattern data stored in the shift register 41 is normalized and then transferred to the identification circuit 60 in the manner as described. FIG. 11C shows the character pattern obtained during the third frame. The width data for this pattern is "001111111000". This width data fulfils the conditions prescribed by the character patterns shown in FIGS. 3A and 3B, and thus the coincidence circuit 73 supplies an output signal. Then, the comparator 76 compares the width data "7" from the width data detector 75 and the width data "8" stored in the memory 80. Essentially, it compares the numbers of "1" bits contained in both the width data, and in this case it determines that the width data from the detector 75 is smaller than that stored in the memory 80. Thus, the comparator 76 produces no output signal, and the content of the memory 80 is not renewed. FIG. 11D shows the character pattern obtained in the fourth frame. The width data for this pattern is "011111111100". This data meets the condition prescribed by the character pattern shown in FIG. 3A, and the coincidence circuit 73 thus produces an output signal, whereby the width data from the detector 75 and that of the memory 80 are compared by the comparator 76. Since in this case the number of "1" bits contained in the width data "9" from the detector 75 is greater, a write instruction signal is supplied to the memory 80 for transferring the width data from the detector 75 to the memory 80. At the same time, in response to the trigger signal from the comparator 76 the pulse generator 82 normalizes the character pattern data in the shift register 41 and then supplies a set signal to the identification circuit 60 for interrupting the identifying process in the circuit 60 and resetting it to the initial state. Thereafter, the identification circuit 60 supplies a clock pulse for transfer to the shift register 41 and fetches the normalized character pattern data from the shift register 41 for effecting the identifying process with respect to the fetched data.

Figure 11E:
Figure 11F:
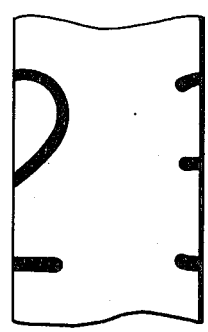

FIG. 11E shows the character pattern obtained during the fifth frame. The width data for this pattern is "111111100000". Since this data meets none of the conditions specified by the character patterns shown in FIGS. 3A through 3E, the coincidence circuit 73 produces no output signal, and the content of the memory 80 is not renewed. Thus, the character pattern shown in FIG. 11D remains as optimum data, with respect to which the identification circuit 60 effects subsequent identifying process. FIG. 11F shows the character pattern obtained during the sixth frame. The width data for this pattern is "111100000011". Again in this case, neither coincidence circuit 73 nor comparator 75 produces any output signal, and the character pattern shown in FIG. 11D is still held as the optimum data.

As has been shown, in the above embodiment the identification process is effected with respect to pattern data corresponding to the character pattern having the largest width among the detected effective character patterns, so that it can be carried out readily and reliably.

Figure 12:
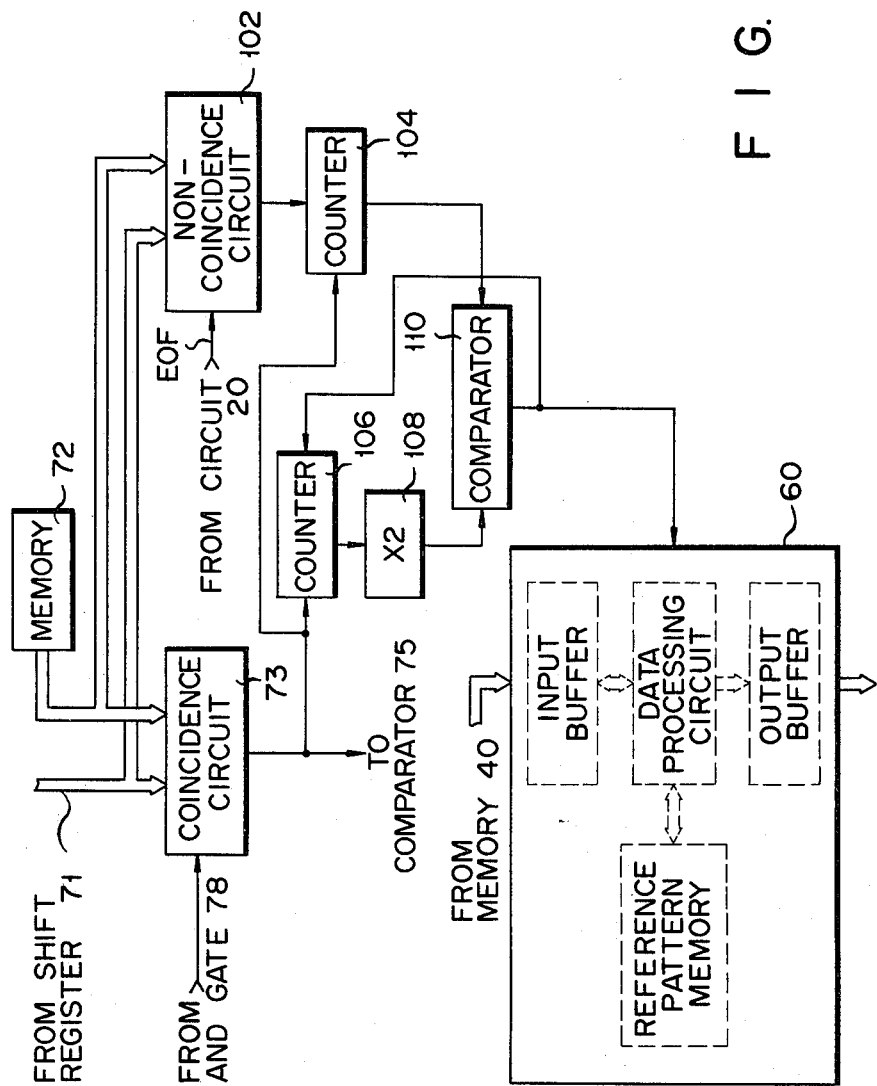
FIG. 12 is a schematic circuit diagram of a re-reading prevention circuit assembled in the character reading apparatus shown in FIG. 2 and serving to prevent the generation of two or more results of identification for the same character.

FIG. 12 shows a re-reading prevention circuit for preventing the repeated reading of the same character by the above embodiment of the character reading apparatus. This re-reading prevention circuit includes a noncoincidence circuit 102, which compares the width data from the shift register 71 (FIG. 8) and memory 72 in response to the frame synchronization signal EOF from the timing circuit 20 and produces an output signal when the width data from the shift register 71 meets none of the conditions prescribed by the character patterns shown in FIGS. 3A through 3D, a counter 104 for counting the output signal from the noncoincidence circuit 102, a counter 106 for counting the output signal from the coincidence circuit 73, a doubler 108 for doubling the counter content and a comparator 110 for comparing the output signals from the doubler 108 and counter 104. When the two inputs to the comparator 110 coincide, it supplies a reset signal to the counter 106 while supplying an output signal to the data processing circuit in the identification circuit 60 to let the result of operation in the data processing circuit be transferred to an output buffer register in the identification circuit 60. As has been mentioned earlier, the data processing circuit is set to the initial state in response to the output signal from the control circuit 70, whereby the character pattern data transferred from the pattern memory 40 is transferred into the input buffer register and sequentially compared with reference pattern data read out from the reference pattern memory in the identification circuit 60 so as to identify the fetched pattern data according to the pattern matching method.

The operation of the the re-reading prevention circuit will now be described with reference to FIGS. 13A through 13G.

Figure 13A:
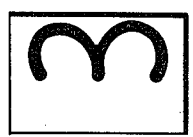
FIGS. 13A through 13G show a series of character patterns detected by the moving scanner for the purpose of illustrating the operation of the re-reading prevention circuit shown in FIG. 12.
Figure 13B:
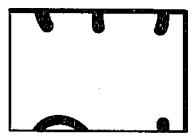
Figure 13C:
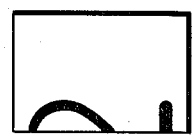
Figure 13D:
Figure 13E:
Figure 13F:

Assume now that with the movement of the area scanner 10 along a line of characters a width data corresponding to the character pattern shown in FIG. 13A which is identified as effective data for the first time in an N-th frame is stored in the shift register 51. At this time, the coincidence circuit 73 produces an output signal to set the content of the counter 106 to "1" and reset the counter 104. Since at this time the output data from the doubler 108 and counter 104 do not coincide, the comparator 110 produces no output. Subsequently, when effective width data corresponding to the character pattern shown in FIG. 13B is stored in the shift register 51 in the (N+1)th frame, the coincidence circuit 73 produces an output signal to change the content of the counter 106 from "1" to "2". Then, when a width data corresponding to the character pattern shown in FIG. 13C, which is "111111100000" in value and meets none of the conditions shown in FIGS. 3A through 3D, is stored in the shift register 51 in the (N+2)th frame 51, the noncoincidence circuit 102 produces an output signal in response to the frame signal EOF, thus changing the content of the counter 104 to "1". Since the output signal of the doubler 108 is "4" at this time, the output data of the doubler 108 and counter 104 do not coincide, so that the comparator 110 produces no output signal. In the (N+3)th and (N+4)th frames, width data corresponding to the respective character patterns as shown in FIGS. 13D and 13E are successively stored in the shift register 51. Since these width data are respectively "111110000000" and "111100000000" and meet none of the conditions shown in FIGS. 3A through 3D, the noncoincidence circuit 102 produces two consecutive output signals, thus changing the content of the counter 104 to "3". When a width data corresponding to the character pattern as shown in FIG. 13F is stored in the shift register 51 in the (N+5)th frame, the noncoincidence circuit 102 again produces an output signal since this width data is "110000000011" in value and coincides with none of the character patterns shown in FIGS. 3A through 3D, thus setting the counter 104 to a value "4". At this time, the contents of the doubler 108 and counter 104 coincide, and the comparator 110 thus produces an output signal which is supplied as reset signal to the operation circuit in the identification circuit 110, and data corresponding to the result of the identification process for the optimum character pattern among the character patterns shown in FIGS. 13A and 13B is stored in the output buffer register in the identification circuit 60.

Figure 13G:

Afterwards, when a width data corresponding to the character pattern shown in FIG. 13G, which is identified to be effective for the first time with respect to a numeral at the next digit, is stored in the shift register 51 in an (N+M)th frame, the coincidence circuit 73 produces an output signal to reset the counter 104 and set the content of the counter 106 to "1".

As has been described, with the use of the rereading prevention circuit as shown in FIG. 10, only a single character pattern data is subjected to the identification process for each character pattern, and the individual optimum pattern data are successively stored in the output buffer register in the identification circuit 60.

Figure 14:
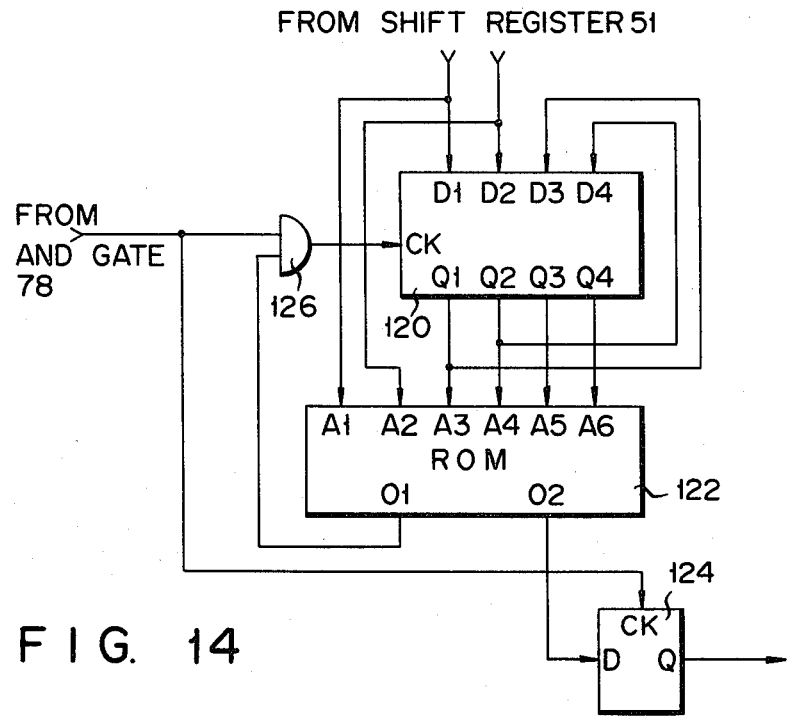
FIG. 14 is a schematic block diagram of a direction detection circuit for detecting the direction of movement of the scanner with respect to a character line.

FIG. 14 shows a direction detection circuit for detecting the direction of movement of the scanner 10 moving along a line of characters. The direction detection circuit includes a register 120 having four input terminals D1 to D4 and from output terminals Q1 to Q4, a read only memory (ROM) 122 having address input terminals A1 to A5 and output terminals Q1 and Q2 and a flip-flop 124 having a D input terminal connected to the O2 output terminal of the ROM 122. Output signals of, for example, the first and fourth bits of the shift register 51 are respectively supplied to the D1 and D2 input terminals of the register 120 and to the A1 and A2 input terminals of the ROM 122. The Q1 and Q2 output terminals of the register 120 are respectively connected to the D3 and D4 input terminals of the register 120 and to the A3 and A4 input terminals of the ROM 122 and the Q3 and Q4 output terminals of the register 120 are respectively connected to the A5 and A6 input terminals of the ROM 122. The O1 output terminal of the ROM 122 is connected to a CK terminal through an AND gate 126 which receives at one input terminal an output signal from the AND gate 78 of the control circuit 70 (FIG. 8). When the ROM 122 receives address signal "111000" or "000111", it produces a Q output signal "1" to the flip-flop 124 so as to cause a high level output signal to be produced therefrom. When the ROM 122 receives address signal "110100" or "001011", it produces an output signal "0" to the flip-flop 124 so as to cause a low level output signal to be produced therefrom. The flip-flop 124 supplies an output signal as a direction indication signal to the data processing circuit in the identification circuit 60, and the bit position of the output buffer register into which the identified character pattern data is written is determined in accordance with the direction indication signal. Further, the ROM 122 produces a high level signal when receiving at the A1 and A2 input terminals data which are different from those at the A3 and A4 input terminals.

The operation of the direction detection circuit shown in FIG. 12 will now be described with reference to FIGS. 15A through 15G.

Figures 15A, 15B, 15C, 15D:
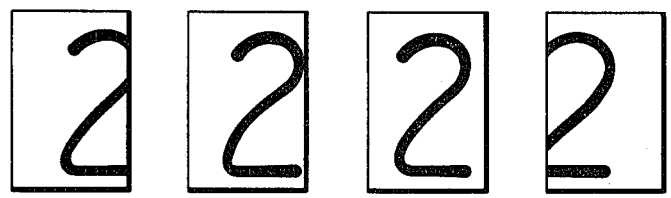
FIGS. 15A through 15G show a series of character patterns detected by the moving scanner for the purpose of illustrating the operation of the re-reading prevention circuit shown in FIG. 14.

It is now assumed that a width data corresponding to the character pattern as shown in FIG. 15A is stored in the shift register 51 in an N-th frame. This width data is "000000111111" in value, so that at this time input data "00" is supplied to the register 120. Since data supplied to the A3 and A4 input terminals of the ROM 122 are "00", the ROM 122 produces no output signal from the O1 output terminal. When a width data "000111111111" corresponding to the character pattern shown in FIG. 15B is stored in the (N+1)th frame, data "10" is supplied to the A1 and A2 input terminals of the ROM 122. At this time, the ROM 122 produces an output signal to enable the AND gate 126, so that an output signal from the AND gate 78 of the control circuit 170 is supplied to the register 120 for transferring data "10" therein. When a width data "001111111111" corresponding to the character pattern as shown in FIG. 15C is stored in the shift register 51 in the (N+2)th frame, the same data "10" as those at the Q1 and Q2 output terminals of the shift register 120 are supplied from the shift register 51 to the ROM 122, so that the ROM 122 produces no output signal, and the contents of the shift register 120 are not changed. When a width data "111111100000" corresponding to the character pattern as shown in FIG. 15D is stored in the (N+3)th frame, data "11" is supplied from the shift register 51 to the ROM circuit 122, so that the ROM circuit 122 receives data "111000" at the address input terminals. As a result, the ROM 122 produces a high level signal to the input terminal of the flip-flop 124 for setting this flip-flop 124 to generate a high level signal. On the other hand, since data at the A1 and A2 input terminals are different from those at the A3 and A4 input terminals, an output signal from the AND gate 78 is supplied to the CK terminal of the shift register 120 through the AND gate 126.

Figures 15E, 15F, 15G:
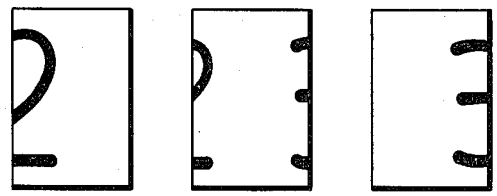

When a width data "111100000000" corresponding to the character pattern as shown in FIG. 15E is stored in the (N+4)th frame, the ROM 122 produces no output signal, so that the contents of the register 120 are not changed. When a width data "110000000011" corresponding to the character pattern as shown in FIG. 15F is stored in the (N+5)th frame, the ROM 122 produces an output signal, so that the content of the register 120 is changed to "0111". When a width data "000000001111" corresponding to the character pattern as shown in FIG. 15G is stored in the (N+6)th frame, the ROM receives address data "000111" to ROM 122 produce high level output signals from the O1 and O2 output terminals so that the contents of the register 120 are changed to "0001". Thus, in this example, a high level output signal is produced from the direction detection circuit shown in FIG. 14, and when the identification circuit 60 detects high level signal produced from the flip-flop 124, it determines that the scanner 10 has been moved from left to right along the character line, so that the identified numerals are successively written in the output buffer memory in the order of detection in the direction, for instance, from higher digit to lower digit.

When the width data corresponding to the character patterns shown in FIGS. 15G through 15A are detected in the mentioned order in the N-th through (N+6)th frames, the ROM 122 is given address data "001011" and "110110", so that a low level output signal is produced from the ROM 122 to the flip-flop 124. Thus, the flip-flop 124 supplies a low level output signal to the identification circuit 60. When the identification circuit 60 detects the low level output signal produced from the direction detection circuit, it determines that the scanner 10 has moved from right to left along the character line, so that the identified numeral data are successively written in the output buffer memory from the lower digit to higher digit.

Figure 16:
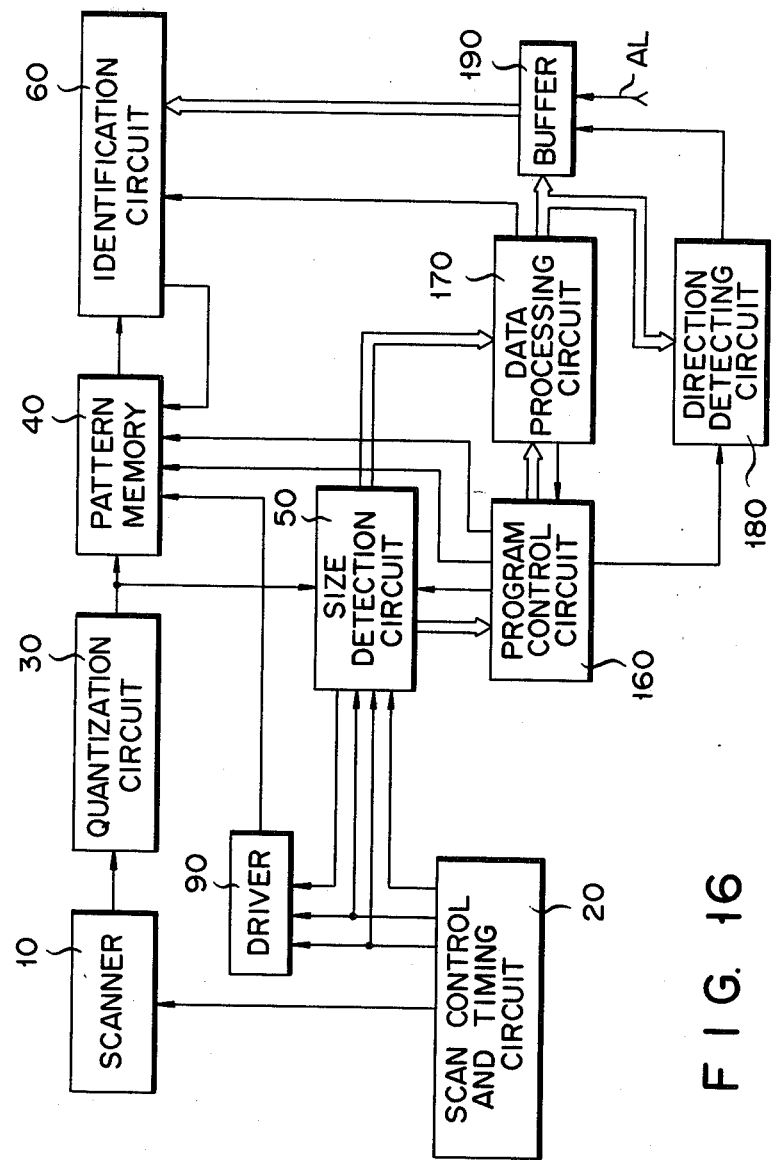
FIG. 16 is a block diagram showing a different embodiment of the character reading apparatus according to the invention.

FIG. 16 shows a different embodiment of the character reading apparatus according to the invention.

In this embodiment, scanner 10, scan control and timing circuit 20, quantization circuit 30, pattern memory 40, character size detection circuit 50, identification circuit 60 and driver circuit 90 are substantially the same in construction as those used in the former embodiment. In this embodiment, height signal and end-of-character signal from the character size detection circuit 50 are supplied to a program control circuit 160, and width data from the circuit 50 is supplied to a data processing circuit 170. The processing circuit 170 functions such that when it detects that the character pattern data stored in the pattern memory 40 can be identified based on the width data from the character size detection circuit 50, it normalizes the character pattern data stored in the pattern memory 40 and then supplies a set signal to the identification circuit 60. As a result, the identification circuit 60 supplies a clock pulse for transfer to the pattern memory 40 and fetches character pattern data from the pattern memory 40 for effecting the identification process for the fetched data. Meanwhile, the data processing circuit 170 supplies bit data of a predetermined plurality of bits among the width data to a direction detection circuit 180. The direction detection circuit 180 detects the direction of movement of the scanner 10 according to the bit data from the data processing circuit 170 principally in the same manner as the direction detection circuit shown in FIG. 14, and supplies a direction indication signal to the identification circuit 60. The identification circuit 60 determines the position of storage of each identified character pattern data according to the output signal from the direction detection circuit 180.

Figures 17, 18:
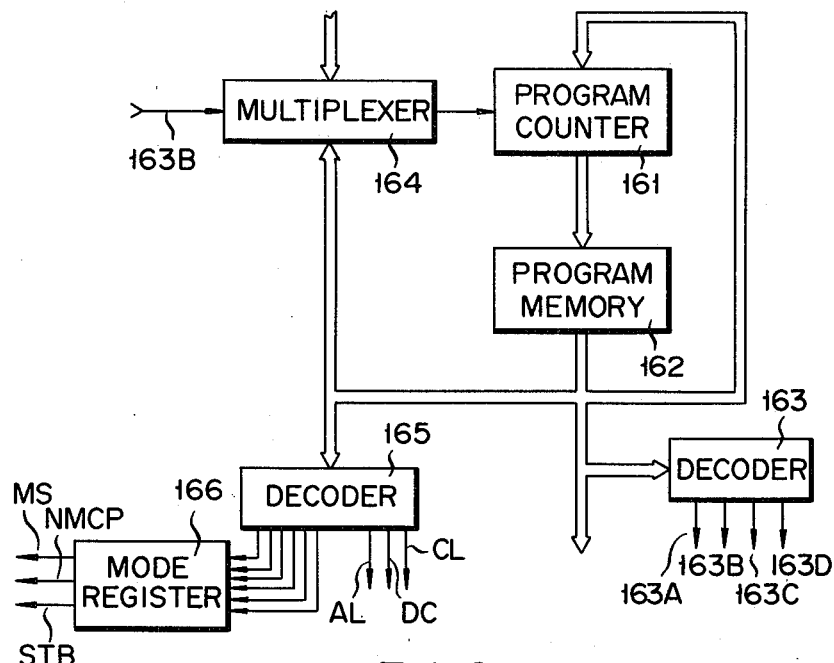
FIG. 17 is a block diagram showing the construction of a program control circuit used in the character reading apparatus shown in FIG. 16.
FIG. 18 is a view showing a memory map stored in a program memory in the program control circuit shown in FIG. 17.

FIG. 17 is a block diagram showing the detailed construction of the program control circuit 160. This circuit 160 includes a program counter 161, a program memory 162 which receives as address signal the count signal of the program counter 161 and produces 16-bit data, and a decoder 163 for producing four status signals 163A to 163D in accordance with the first to third upper bits of the program memory 162. Of the 16-bit data from the program memory 162, 8-bit data is fed as destination address signal back to the program counter 161. Further, of the 16-bit data from the program memory 162, 5-bit data is supplied to a multiplexer 164 and a decoder 165. The decoder 165 produces a clear signal CL, a direction checking signal DC, an answer latch signal AL and six status signals. A MODE register 166 produces a mode selection signal MS, a normalization clock pulse signal NMCP and a synchronization signal STB according to the status signals from the decoder 165. The multiplexer 164 receives at one of its ports the output signal EOF and EOL from the timing circuit 20 and at its other port the output signals from the AND gates 55 and 56 of the control circuit 70 and multiplexes these input data for controlling the operation of the program counter 161.

The program memory 162 has character pattern data corresponding to the conditional character patterns as shown in FIGS. 3A through 3E and also program memory areas as shown in FIG. 18.

Figures 19, 20:
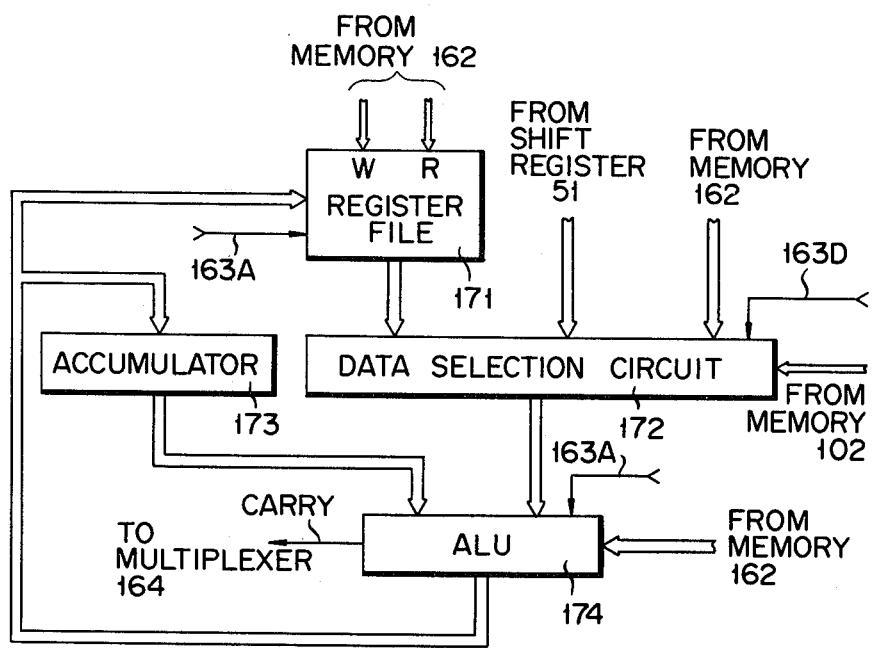
FIG. 19 is a block diagram showing a data processing circuit used in the character reading apparatus shown in FIG. 16.
FIG. 20 is a view showing a memory map stored in a register file in the data processing circuit shown in FIG. 19, FIGS. 21 through 23 show a flow chart for illustrating the operation of the character reading apparatus shown in FIG. 16.

FIG. 19 is a block diagram showing the detailed construction of the data processing circuit 170. This circuit 170 includes a register file 171, a data selection circuit 172 for selectively receiving the output data from the register file 171, shift register 51 and program memory 162, an accumulator 173 and an arithmetic logic unit (ALU) 174 which processes the output data from the accumulator 173 and data selection circuit 172 and supplies output data to the accumulator 173 and register file 171.

A memory map as shown in FIG. 20 is stored in the register file 171.

Figure 21:
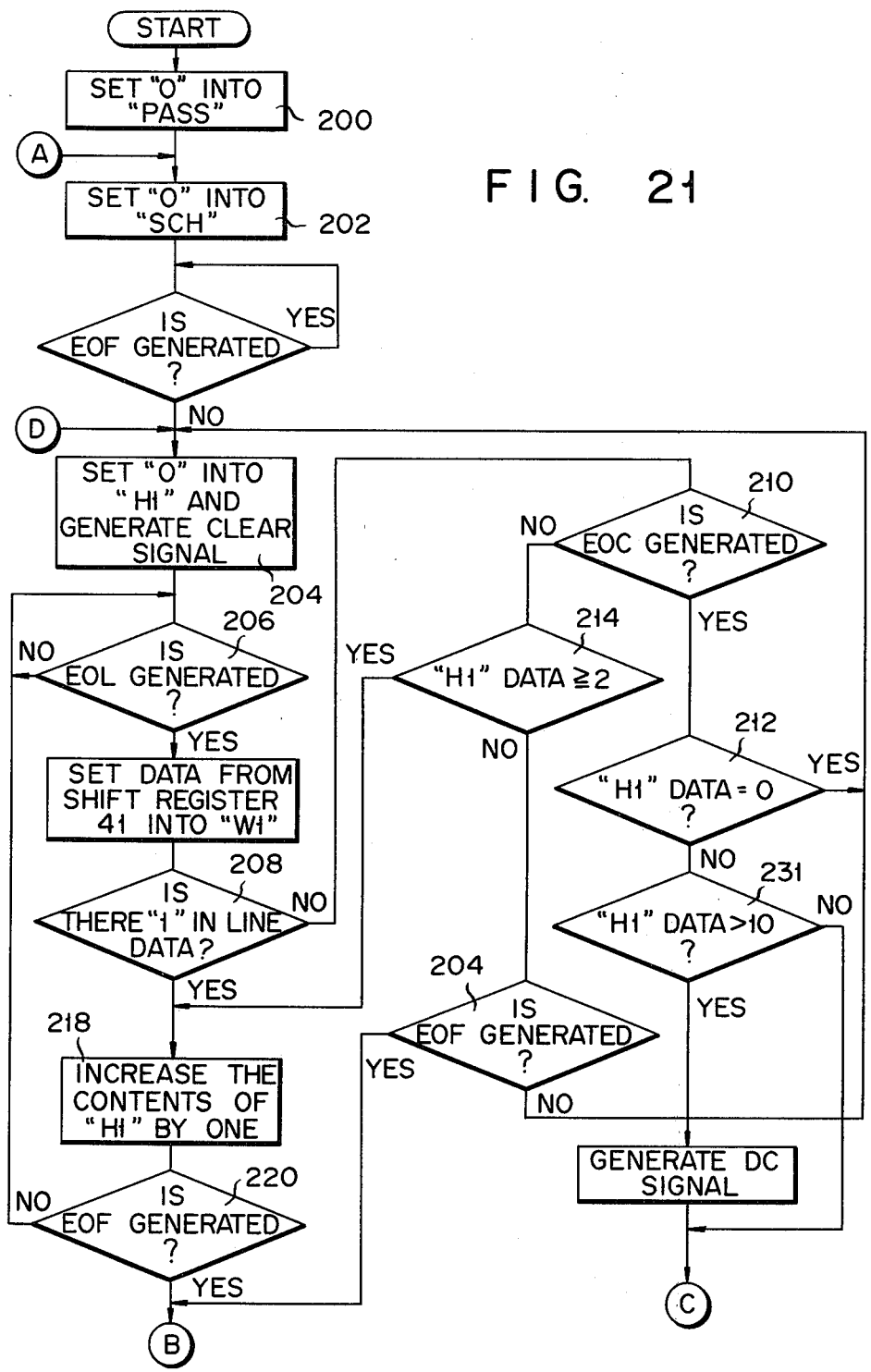
Figure 22:
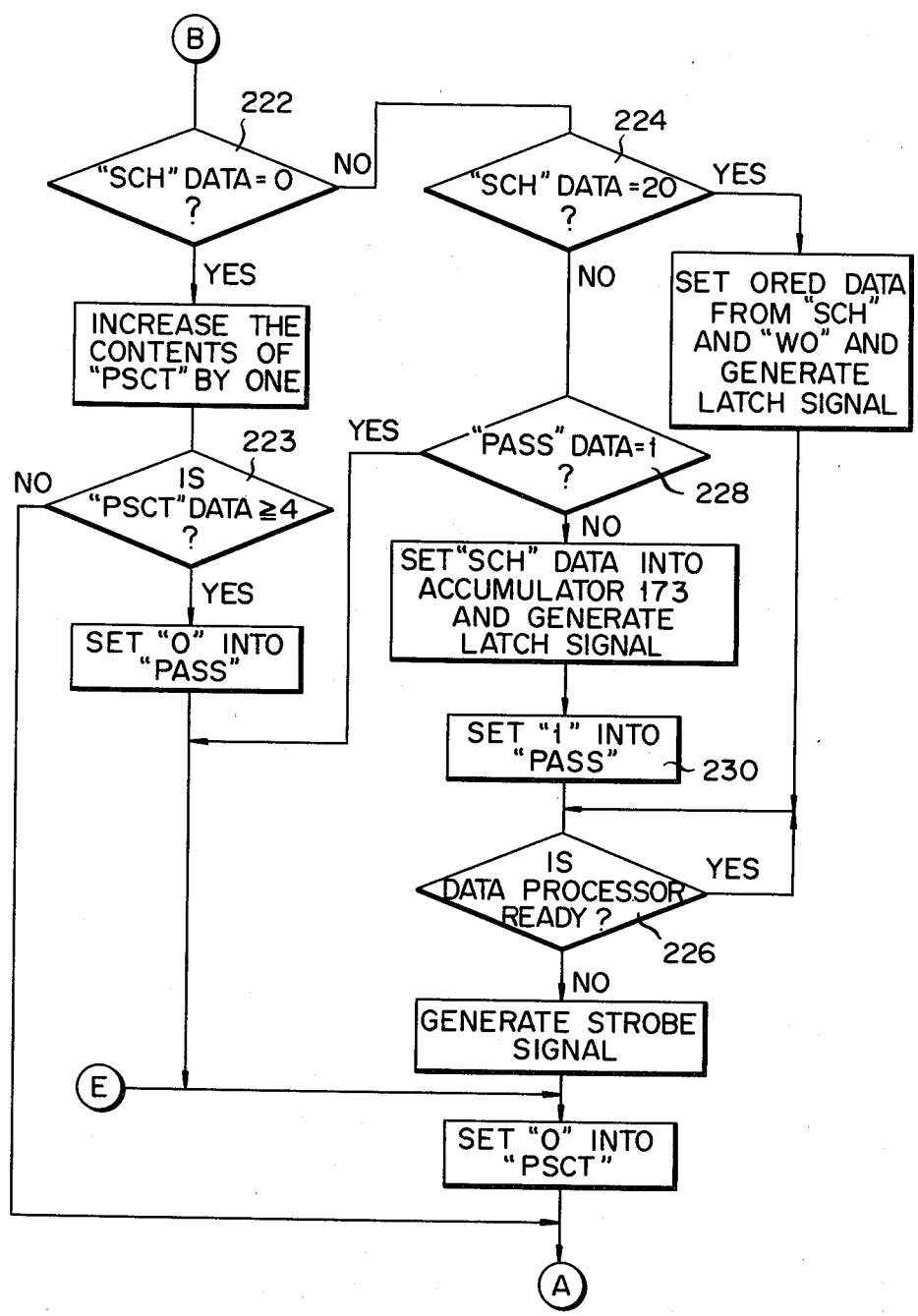
Figure 23:
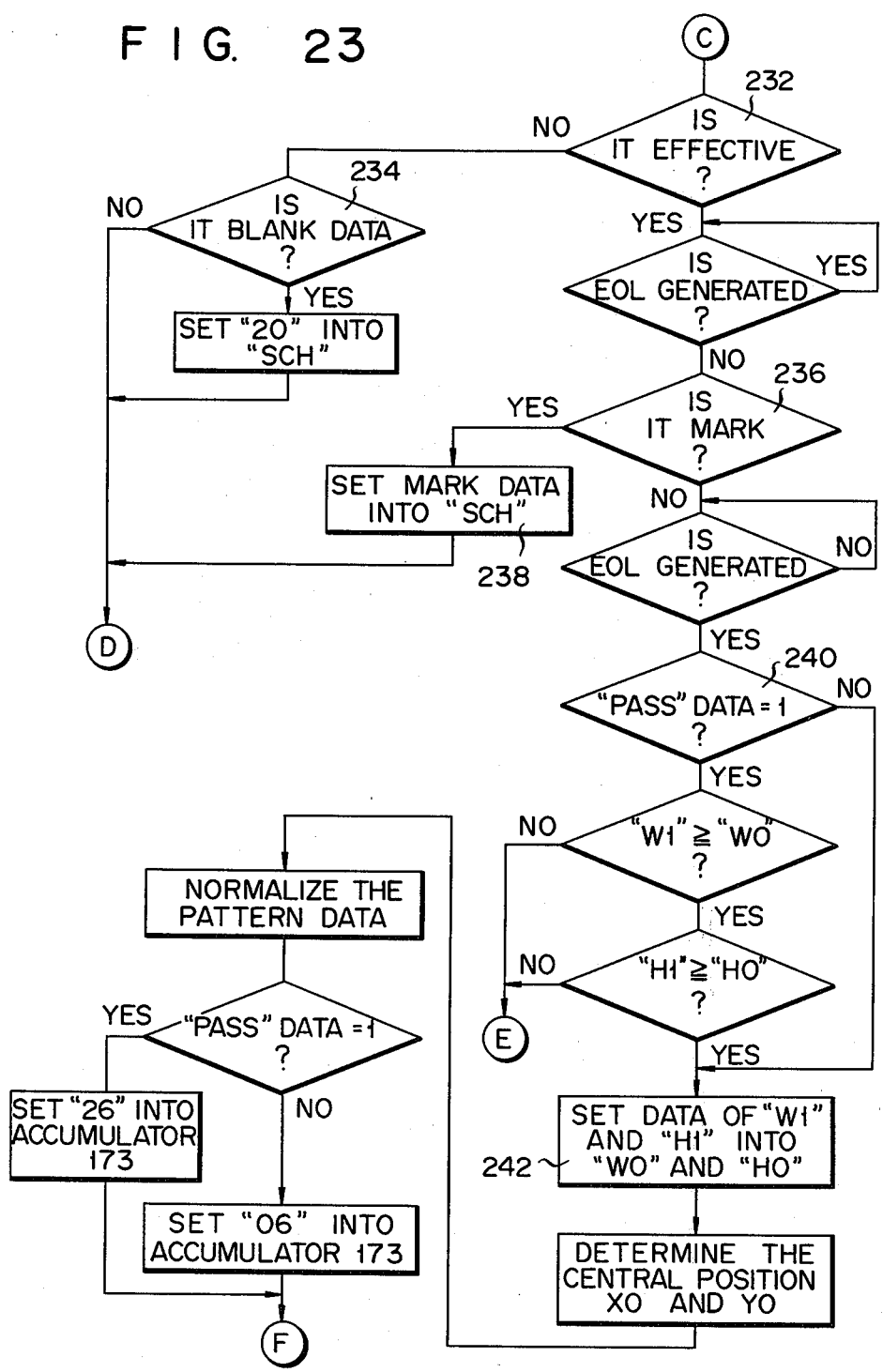

The operation of the character reading apparatus shown in FIGS. 16, 17 and 19 will now be described with reference to the flow chart of FIGS. 21 through 23.

At the start of the operation, data including a first bit of "0" is produced from the program memory 162, and according to this data the decoder 163 supplies the output signal 163A to the register file 171. With the 13-th to 16-th bits from the program memory 162, i.e., write address signals, memory area "PASS" and "SCH" in the register file 171 as shown in FIG. 20 are specified, and "0" is successively set into these memory areas in steps 200 and 202. Then, 16-bit data with first and second bits of "11" is produced from the program memory 162, and the output signal 16B from the decoder 163 is supplied together with the 3-rd to 18-th bits of the 16-bit data, i.e., status condition data, to the multiplexer 164. As a result, the multiplexer 164 holds the counter 161 inoperative so long as the frame signal EOF is present, and upon detection of the vanishing of the frame signal it supplies a count enable signal to the counter 161 to set this counter to a count value predetermined by the 9-th to 16-th bits, i.e., destination address data. As a result, the program memory 162 produces data including first bit of "0", and the decoder 163 produces the output signal 163A. In the next step 204, a memory area "H1" is specified and cleared by a write address signal contained in the data from the program memory 162. Then, the program memory produces data with first to third bits of "0", and the output signal 163C is supplied from the decoder 163 to the decoder 165. Also, a clear signal is supplied from the decoder 165 to the shift register 51 according to the 4-th to 8-th bits from the memory 162, i.e., command data. Then, in a step 206 whether or not the line signal EOL is present is checked by the multiplexer 164. When this signal is detected, the counter 161 is set to a predetermined value to cause the program memory 162 to produce 16-bit data with 1-st to 3-rd bits of "0". As a result, the output signal 163D is supplied from the decoder 163 to the data selection circuit 172, and the selection circuit 172 fetches the data from the shift register 51 according to the 10-th and 11-th bits of this 16-bit data, i.e., selection data. As has been described earlier, the data present in the shift register 51 at the time of appearance of each line sync. signal is the width data for the character pattern section obtained by the previous scanning. The decoder 163 then produces the output signal 163A in response to the first bit of "0" in the 16-bit data from the program memory 162, and the ALU 174 is instructed by the 2-nd to 7-th bits of the 16-bit data, i.e., ALU instruction data, to fetch data from the selection circuit 172. As a result, the line data from the shift register 51 is written in the accumulation register 173 and stored in a memory area "W1" specified by the 13-th to 16-th bits of the 16-bit data, i.e., write address data. Then, in a step 208 the decoder 163 produces the output signal 163B in response to the data from the program memory 162 with first and second bits of "11", and the multiplexer checks whether or not a high level signal is being produced from the AND gate 56 of the character size detection circuit 50 shown in FIG. 4, that is, whether or not the line data obtained this time contains "1". If it is detected that the line data does not contain "1", the decoder 163 produces the output signal 163D, and in a step 210 whether or not the end-of-character signal EOC is supplied from the AND gate 55 of the character size detection circuit 50 to the multiplexer 164 is checked. If the end-of-character signal EOC is detected here, the operation goes to a step 212, in which the decoder 163 produces the output signal 163A in response to the output data from the program memory 162, and data is read out from the memory area "H1" of the register file 171 according to the 8-th to 12-th bits from the program memory 162, i.e., read address data. The data read out from the register file 171 is selected by the selection circuit 172 and supplied to the ALU 174. At this time, the ALU 174 adds binary data "1" to the data read out from the memory area "H1" and checks if the first bit of the result is "0". If this bit is "0", it detects that the data having been stored in the memory area "H1" is "0" and supplies a carry signal of "1" to the multiplexer 164. When it is detected that the data stored in the memory area "H1" is "0", the operation goes back to the step 204.

If the end-of-character signal EOC is not detected in the step 210, in a step 214 whether or not the data stored in the memory area "H1" of the register file 171 is "2" or above is checked in the manner similar to the step 212. If it is detected that the data stored in the memory area "H1" is less than "2", in a step 216 whether or not the frame sync. signal EOF is at the high level is checked. If it is detected that the frame sync. signal EOF is at the low level, the operation goes back to the step 204.

If it is detected in the step 208 that the line data transferred from the shift register 51 contains "1", or if it is detected in the step 214 that the data stored in the memory area "H1" is "2" or above, in a step 218 "1" is added to the content of the memory area "H1". More particularly, in this case the decoder 163 produces the output signal 163A in response to the output data from the program memory 162, while the memory area "H1" of the register file 171 is specified and the data in this memory area "H1" is fetched out by the selection circuit 172. Then, the count of the program counter 161 is increased by one count to renew the output data from the program memory 162 so as to cause the decoder 163 to produce the output signal 163D, and a selection signal for selecting the output data from the register file 171 is supplied to the data selection circuit 171. Thereafter, the content of the counter 161 is increased to cause the program memory to produce output data including a first bit of "0" for causing the decoder 163 to produce the output signal 163A and instruction data for causing the ALU 174 to add "1" to the input data. At this time, the result of operation in the ALU 174 is written in the memory area "H1" according to the write address data contained in the data from the program memory 162. The step 218 is carried out in this way, whereby the height of the character pattern obtained by the scanning so far is determined.

After the step 218, the operation proceeds to the step 220, in which whether or not the frame sync. signal EOF is at the high level is checked. If it is detected here that the frame signal is at the low level, the operation returns to the step 206. If it is detected in the step 216 or 218 that the frame signal is at the high level, it means that character pattern data, width data and height data for the character pattern of one frame have been obtained, and whether or not this character pattern represents a symbol is checked in a step 222. If it is detected in the step 222 that data other than the data representing a symbol such as comma ",", period ".", hyphen or horizontal bar "-" and vertical bar "|", i.e., a space between adjacent characters, is stored in the memory area "SCH" of the register file 171, "1" is added to the data stored in the memory area PSCT in the register file 171. Then, in a step 223 whether or not the data stored in a memory area "PSCT" has become "4" or above is checked. If the data is less than "4", the operation is brought back to the step 202. If it is detected that the data stored in the memory area PSCT is "4" or above, data "0" is successively set in the memory areas "PASS" and "PSCT", and the operation is brought back to the step 202.

If it is detected in the step 222 that the data stored in the memory area "SCH" is other than "0", whether or not the data stored in the memory area "SCH" is "20", i.e., blank data, is checked in a step 224. If it is detected that the data stored in the memory area "SCH" is blank data, that is, the data stored in the shift register 51 has "1" bits only in the highest three digits and three lowest digits, for example, data corresponding to the ORed data of the data stored in the memory areas "SCH" and "WO" is written in the accumulation register 173. At this time, a latch signal AL is supplied to the buffer register 190 for latching the output of the ALU 174 in the buffer register 190. Then, when it is detected in a step 226 that the data processing circuit in the identification circuit 60 is ready for receiving data is checked, the synchronization signal STB is supplied from the MODE register 166 to the data processing circuit in the identification circuit 60. Then, data "0" is set in the memory area "PSCT", and the operation is returned to the step 202.

If it is detected in the step 224 that the memory area "SCH" does not contain data "20", that is, no symbol data is stored in the shift register 41, in a step 228 whether or not the content of the memory area "PASS" is "1", i.e., whether or not an effective character pattern has been obtained, is checked. If it is detected in the step 228 that an effective character pattern has been previously obtained, data "0" is set in the memory area "PSCT", and then operation is returned to the step 202. If it is detected in the step 228 that no effective character pattern has been previously obtained, the content of the memory area "SCT", i.e., data "01" representing a comma, data "02" representing a hyphen, data "03" representing a period or data "04" representing a vertical bar, is stored in the accumulation register, and also the latch signal AL is supplied to the buffer register 190 for latching the output data from the ALU 174 in the buffer register. Then, in a step 230 data "1" is set in the memory area "PASS", and the operation is then brought back to the afore-mentioned step 226.

Figure 24:
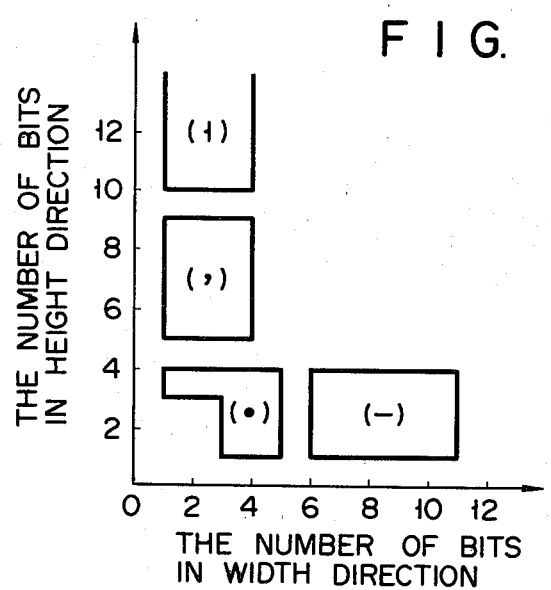
FIG. 24 is a view showing ranges of bit numbers of height and width data required for identification as a symbol pattern.

If it is detected in the step 212 shown in FIG. 19 that data representing the height of the character pattern is not "0", in a step 231 whether or not the height data of the character is greater than "10" is checked. If the height data is found to be greater than "10", the direction signal DC is supplied from the decoder 163 to the direction detection circuit 180, i.e., to the AND gate 126 in the circuit shown in FIG. 14, in lieu of the output signal from the AND gate 78, and then a step 232 is executed. If the height data is "10" or less, the operation then directly goes to the step 232. If the step 232, whether or not the width data meets the condition given by one of the character patterns shown in FIGS. 3A through 3E and also whether or not the data for the comma, period, hyphen and vertical bar are represented by certain bit numbers within predetermined ranges in the height and width directions as shown in FIG. 24 are checked on the basis of the height and width data stored in the memory areas "H1" and "W1". If it is detected in the step 232 that the width data meets none of the conditions and also that the data corresponding to the comma, period, hyphen and vertical bar fail to be represented by bit numbers within the predetermined ranges, whether or not the data obtained in the frame of this time is noise data or blank data is checked in a step 234. In this step 234, if it is detected that the data stored in the memory areas "H1" and "W1" are "111" only in the higher or lower three bits, these data are determined to be blank data, and data "20" is set in the memory area "SCH", before the operation is returned to the step 204. If it is detected in the step 234 that at least eigher one of the data stored in the memory areas "H1" and "W1" is greater than a predetermined value, the operation is directly returned to the step 204.

It it is determined in the step 232 that an effective data is stored in the shift register 41, whether or not the effective data can be determined as symbol data is checked in synchronism with the line sync. signal in a step 236. If it is detected in this step 236 that the data stored in the memory areas "H1" and "W1" have values within predetermined ranges, this effective data is determined to be symbol data, and in a step 238 data representing the detected signal is written in the memory area "SCH".

If it is detected in the step 236 that at least either one of the data stored in the memory areas "H1" and "W1" is greater than a predetermined value, a step 240 is executed in synchronism with the line sync. signal EOL. If it is detected in the step 240 that data "1" is set in memory area "PASS", whether or not the data stored in the memory areas "H1" and "W1" and data stored in the memory areas "H0" and "W0" are compared. When it is detected that the latter data are greater than the former data, data "0" is stored in the memory area "PSCT", and the operation is then returned to the step 202. When it is detected that the data in the memory areas "H1" and "W1" are greater than the data in the memory areas "H0" and "W0", in a step 242, the data in the former memory areas are transferred to the respective latter memory areas. Then, in a step 244 the ALU write X- and Y-axis position data representing the central position of the character pattern in the respective memory areas "X0" and "Y0" according to the data stored in the memory areas "H0" and "W0". The ALU then calculates the number of clock pulses to be applied to the shift register for shifting the central position [X0, Y0] of the pattern to a predetermined position [Xp, Yp], for instance ["6", "8"], and stores this data in the memory area "N". Thereafter, the MODE register 166 supplies a normalization clock pulse signal through the OR gate 93 in the driver circuit 90 to the shift register 41 in accordance with the output data from the program memory 162. Every time a clock pulse is produced from the MODE register 166, the decoder 106 produces the output signals 163A, 163D and 163A in the mentioned order, causing the data stored in the memory area N of the file 171 to be read out and reduced by one count in the ALU 174 and storing the result in the memory area N in the register file 171, this down-counting operation being continued until it is detected that the data in the memory area "N" is "0".

Figure 25:
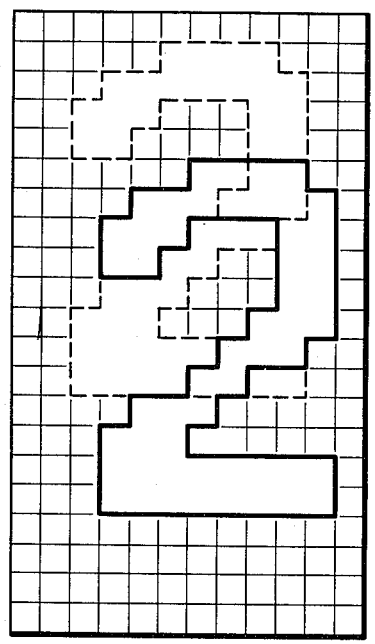
FIG. 25 is a view showing the positional relationship between a detected character pattern and a normalized character pattern used for illustrating the operation of normalizing the detected character pattern.

By the above operation, the character pattern data stored in the shift register 41 representing, for instance, a character pattern shown by solid line in FIG. 25 is changed to character pattern data representing a (shaded) character pattern shown by broken line.

Thereafter, if it is found that "1" is set in the memory area "PASS", data "26" is set in the accumulation register 173, and the output data of the ALU 174 at this time is latched in the buffer register 190. Upon reception of the data from the buffer register 190, the identification circuit 60 stops the prevailing identification process and supplies a transfer pulse through the OR gate 93 shown in FIG. 7 to the clock terminal of the shift register 41 to let the input buffer register fetch the normalized character pattern data stored in the shift register 41. If "1" is not set in the memory area "PASS", the accumulation register 173 is set to "06", and the output data from the ALU 174 is latched in the buffer register 190. Upon reception of the output data from the buffer register 190, the identification circuit 60 supplies a transfer pulse to the clock input terminal of the shift register 41 to let the normalized character pattern data stored in the shift register 41 to be fetched by the input buffer register. Thus, the data processing circuit in the identification circuit 60 is caused to effect the identification process on the basis of the data fetched in the input shift register, and the result is written in the output buffer register in the order determined by the direction indication signal from the buffer register 190.

As has been determined, in this embodiment the identification circuit 60 starts the identification process when an effective character pattern data is obtained for a character, and when an effective pattern data having greater height and width data then those of the first effective character pattern data is detected it stops the identification process so far and starts identification process afresh for the new effective character pattern data. Thus, it is possible to obtain reliable result of identification.

In addition, in the operation of this embodiment, when it is detected in the step 223 that the data in the memory area "PSCT" in the register file 171 is above "4", the content of the memory area "PASS" is cleared, and a subsequently detected effective character pattern data is determined to represent a character of a different bit, thus causing the identification circuit 60 to start identification process for it.

While some preferred embodiments of the invention have been described above, it is to be understood that these embodiments are for purpose of illustration only and are not intended as a definition of the limits of the invention.

What is claimed is:

1. A character reading apparatus comprising:
photoelectric converting means having a two-dimensional array of photoelectric converting elements and manually moved for periodically and optically scanning a character and periodically producing character pattern data;
character pattern identifying means for executing identification process on the basis of the character pattern data from said photoelectric converting means;
first memory means storing conditional data for defining a range of size of a character pattern capable of being identified;
second memory means; and
a control circuit means including character size detection means connected to receive a character pattern data from said photoelectric converting means and derive character pattern size data from each character pattern data generated from said photoelectric converting means, judging means for checking whether or not the character pattern data from said photoelectric converting means meets the condition defined by said conditional data stored in said first memory means, said judging means producing an output signal when detecting that the character pattern data from said photoelectric converting means meets the condition defined by said conditional data stored in said first memory means; and comparator means for comparing, in response to the output signal from said judging means, data from said second memory means and character pattern size data from said character size detection means; said comparator means producing, when it is detected that the character pattern size data from said character size detection means is greater than the data from said second memory means, an output signal to said second memory means for causing the data from said character size detection means to be stored in said second memory means, and said control circuit producing an output signal after an output signal is produced from said comparator means, to set said character pattern identifying means to an initial state for causing identification process to be started on the basis of the character pattern data from said photoelectric converting means.

2. A character reading according to claim 1, wherein said first memory means stores conditional data concerning the width of said character pattern effective for identification, and said control circuit further includes third memory means for storing character pattern data corresponding to a character pattern having been scanned and said character size detection means includes width detecting means connected to receive character pattern data from said third memory means, detect the width of the scanned character pattern based on the character pattern data from said third memory means and supply width data to said second memory means and comparator means.

3. A character reading apparatus according to claim 2, wherein said character size detection means further includes height detecting means connected to receive character pattern from said photoelectric converting means and detect the height of the scanned character pattern based on the character pattern data from said photoelectric converting means, and means for supplying an inhibit signal to said judging means to inhibit the operation thereof when it detects that the height data from said height detecting means has a value outside a predetermined range.

4. A character reading apparatus according to claim 1, 2 or 3, in which said identifying means includes a data processing circuit for executing identification process for the character pattern data from said photoelectric converting means and an output memory, and said control circuit further includes second judging means producing an output signal every time it detects that an output data produced from said photoelectric converting means fails to meet the condition prescribed by the conditional data stored in said first memory means, and counting means for counting the output signal from said second judging means and, when the count value reaches a preset value, supplying an output signal to said processing circuit to cause transfer of data concerning the result of operation by said data processing circuit to said output memory.

5. A character reading apparatus according to claim 4, wherein said counting means includes a first counter for counting the output signal from said second judging means and a counting circuit for counting the output signal from said first judging means and determining said preset value according to the count value thus obtained.

6. A character reading apparatus according to claim 5, wherein said counting circuit includes a second counter for counting the output signal from said first judging circuit and producing an output signal corresponding to the count value thus obtained, and a comparator circuit for comparing the output signals from said first and second counters and supplying an output signal to said identifying means when the compared signals coincide with each other.

7. A character reading apparatus according to claim 1, 2 or 3, which further comprises a position detecting means connected to successively receive output signal from said position detecting means and detect the relative width-wise position of the scanned character pattern with respect to said photoelectric converting means, and a direction detecting means for detecting the direction of movement of said photoelectric converting from a plurality of successive output signals produced from said position detecting means and supplying a direction indication signal to said identifying means.

* * * * *